United States Patent
Dixon et al.

(10) Patent No.: US 9,077,780 B2
(45) Date of Patent: Jul. 7, 2015

(54) A/B TESTING

(71) Applicant: FMR LLC, Boston, MA (US)

(72) Inventors: Eleri Dixon, Boston, MA (US); Emily Enos, Boston, MA (US); Scott Brodmerkle, Boston, MA (US)

(73) Assignee: FMR LLC, Boston, MA (US)

( * ) Notice: Subject to any disclaimer, the term of this patent is extended or adjusted under 35 U.S.C. 154(b) by 53 days.

(21) Appl. No.: 14/075,382

(22) Filed: Nov. 8, 2013

(65) Prior Publication Data

US 2014/0115039 A1  Apr. 24, 2014

Related U.S. Application Data

(63) Continuation of application No. 13/111,505, filed on May 19, 2011, now Pat. No. 8,583,766, which is a continuation of application No. 11/044,499, filed on Jan. 27, 2005, now Pat. No. 7,975,000.

(51) Int. Cl.
G06F 15/16 (2006.01)
H04L 29/06 (2006.01)
G06Q 30/02 (2012.01)

(52) U.S. Cl.
CPC ............... *H04L 67/42* (2013.01); *G06Q 30/02* (2013.01); *G06Q 30/0242* (2013.01); *G06Q 30/0243* (2013.01); *G06Q 30/0254* (2013.01); *Y10S 715/962* (2013.01)

(58) Field of Classification Search
USPC ......................... 709/203, 217, 219
See application file for complete search history.

(56) References Cited

U.S. PATENT DOCUMENTS

| | | |
|---|---|---|
| 6,427,132 B1 | 7/2002 | Bowman-Amuah |
| 6,438,592 B1 | 8/2002 | Killian |
| 6,473,084 B1 | 10/2002 | Phillips et al. |
| 6,477,575 B1 | 11/2002 | Koeppel et al. |
| 6,493,754 B1 | 12/2002 | Rosborough et al. |
| 6,584,492 B1 | 6/2003 | Cezar et al. |
| 6,611,862 B2 | 8/2003 | Reisman |
| 6,629,135 B1 | 9/2003 | Ross et al. |
| 6,701,363 B1 | 3/2004 | Chiu et al. |
| 6,763,388 B1 | 7/2004 | Tsimelzon |
| 6,839,744 B1 | 1/2005 | Kloba et al. |
| 6,915,271 B1 | 7/2005 | Meyer et al. |
| 6,957,390 B2 | 10/2005 | Tamir et al. |
| 6,983,320 B1 | 1/2006 | Thomas et al. |
| 7,013,289 B2 | 3/2006 | Horn et al. |
| 7,085,820 B1 | 8/2006 | Nickerson et al. |
| 7,152,018 B2 | 12/2006 | Wicks |
| 7,165,088 B2 | 1/2007 | Cohen et al. |
| 7,174,286 B2 | 2/2007 | Martin et al. |
| 7,216,298 B1 | 5/2007 | Ballard et al. |
| 7,254,607 B2 | 8/2007 | Hubbard et al. |

(Continued)

OTHER PUBLICATIONS

Alt, Brian and Usborne, Nick. "A/B Split Testing," Marketing Experiments, Aug. 16, 2005, pp. 1-11.

(Continued)

*Primary Examiner* — Melvin H Pollack
(74) *Attorney, Agent, or Firm* — Fish & Richardson P.C.

(57) ABSTRACT

Performing A/B testing of content of a webpage includes selecting one of at least two different versions of the webpage to be displayed to a user through an interactive user interface (e.g., a web browser) based on an identification code, such as an Internet Protocol address or tracker identifier supplied by a cookie, associated with the user.

20 Claims, 4 Drawing Sheets

(56) References Cited

U.S. PATENT DOCUMENTS

| | | |
|---|---|---|
| 7,266,512 B2 | 9/2007 | Cohn et al. |
| 7,299,202 B2 | 11/2007 | Swanson |
| 7,366,996 B2 | 4/2008 | Hoyle |
| 7,370,285 B1 | 5/2008 | Nickerson et al. |
| 7,386,473 B2 | 6/2008 | Blumenau |
| 7,406,516 B2 | 7/2008 | Davis et al. |
| 7,437,312 B2 | 10/2008 | Bhatia et al. |
| 7,451,391 B1 | 11/2008 | Coleman et al. |
| 7,478,121 B1 | 1/2009 | Nickerson et al. |
| 7,523,191 B1 | 4/2009 | Thomas et al. |
| 7,702,752 B2 | 4/2010 | Kirsch et al. |
| 7,814,172 B2 | 10/2010 | Martin et al. |
| 7,823,057 B1 | 10/2010 | Schultz et al. |
| 7,886,221 B1 | 2/2011 | Underwood et al. |
| 2002/0087679 A1 | 7/2002 | Pulley et al. |
| 2002/0120554 A1 | 8/2002 | Vega |
| 2003/0131052 A1 | 7/2003 | Allan |
| 2004/0100490 A1 | 5/2004 | Boston et al. |
| 2004/0254827 A1 | 12/2004 | Hind et al. |
| 2005/0010475 A1 | 1/2005 | Perkowski et al. |
| 2005/0091111 A1 | 4/2005 | Green et al. |
| 2005/0138137 A1 | 6/2005 | Encarnacion et al. |
| 2005/0198116 A1 | 9/2005 | Appleman et al. |
| 2006/0123340 A1 | 6/2006 | Bailey et al. |
| 2006/0271671 A1 | 11/2006 | Hansen |

OTHER PUBLICATIONS

Anderson, Eric, "Optimize your Marketing Campaigns with A/B Testing," WebTrends®, pp. 4 (2004).

Eisenberg, Bryan. "A/B Testing for the Mathematically Disinclined," ClickZ, May 7, 2004, pp. 1-3.

Felix, Uschi. "A Multivariate Analysis of Students' Experience of Web-Based Learning," Australian Journal of Educational Technology, 2001, pp. 1-17.

Lederer, Albert L. et al. "The Technology Acceptance Model and the World Wide Web," Decision Support Systems, vol. 29, Issue 3, Oct. 2000, pp. 269-282.

Liu, Chang and Arnett, Kirk P. "Exploring the Factors Associated with Web Site Success in the context of Electronic Commerce," Information and Management, vol. 38, Issue 1, Oct. 2000, pp. 23-33.

Muylle, Steve et al. "The Conceptualization and Empirical Validation of Web Site User Satisfaction," Information and Management, vol. 41, Issue 5, May 2004, pp. 543-560.

Nielsen, Jakob.. "Putting A/B Testing in its Place," AlertBox, useit.com, Aug. 15, 2005, pp. 1-5.

Prosecution History of U.S. Appl. No. 11/044,499.

FIG. 2A

Investment Products >
Mutual Funds

Experience Fidelity's 50 years
of successful mutual fund management.

Get prices and performance, evaluate funds, and explore investment ideas.

Gain access to more than 4,500 funds
from more than 350 fund companies.

Find the right fund for your needs.

Spotlight
* Contrafund Manager Praised by Barron's Magazine
* Fidelity Insight: Market Edgy, Cheap Money Era Near End?
* Sector Performance Reviews
* Fidelity Value Strategies Fund Reopened to New Investors
* The Benefits of Value Investing
* New Portfolio Manager Appointments Please carefully consider the fund's investment objectives, risks, charges and expenses before investing. For this and other information, call or write to Fidelity for a free prospectus, or view one online. Read it carefully before you invest or send money.

FIG. 2B

Investment Products >
Mutual Funds

Experience Fidelity's 50 years
of successful mutual fund management.

Get prices and performance, evaluate funds, and explore investment ideas.

Gain access to more than 4,500 funds
from more than 350 fund companies.

Find the right fund for your needs.

Spotlight
* Barron's Magazine Praises Contrafund Manager
* Fidelity Insight: Market Edgy, Cheap Money Era Near End?
* Sector Performance Reviews
* Fidelity Value Strategies Fund Reopened to New Investors
* The Benefits of Value Investing
* New Portfolio Manager Appointments Please carefully consider the fund's investment objectives, risks, charges and expenses before investing. For this and other information, call or write to Fidelity for a free prospectus, or view one online. Read it carefully before you invest or send money.

A/B TESTING

CLAIM OF PRIORITY

This application is a continuation (and claims the benefit of priority under 35 U.S.C. §121) of U.S. application Ser. No. 13/111,505, filed May 19, 2011, which is a continuation of U.S. application Ser. No. 11/044,499, filed Jan. 27, 2005. The disclosure of the prior application is considered part of (and is incorporated by reference in) the disclosure of this application.

BACKGROUND

A/B testing is a process used in marketing to isolate and test factors that affect performance of a marketing effort. For example, A/B testing is commonly used in direct mail marketing where different versions of a direct mail letter are sent to different groups of people. The response rates of people receiving the different letters are compared to determine things that worked and didn't work in the letters. Everything from the color of the ink to the appearance of the envelope can be tested using A/B testing.

A/B testing can also be used to isolate and test aspects of content on a website that impacts its effectiveness. For example, A/B testing can be used to determine whether one "place order" button is more effective than another at getting users to order a product.

SUMMARY

In one aspect, the invention features a method, e.g., for performing A/B testing of content on a webpage, that includes selecting one of at least two different versions of an electronic communication (e.g., a web page) to be displayed to a user through an interactive user interface (e.g., a web browser) based on an identification code (e.g., an IP address or other code associated with a computer of the user) associated with the user. In some implementations, the different versions of the electronic communication may be different with respect to a visible interactive element such as a hyperlink.

In another aspect, the invention features a computer-implemented method for performing an A/B test of a webpage that includes receiving a request for a webpage and selecting one of a plurality of different versions of the webpage based on bits of an identification code associated with a user computer making the request.

Implementations may include one or more of the following features. The identification code may be an address, such as an IP address, associated with a user computer making the request (e.g., a user computer or a proxy computer acting on behalf of the user computer). The identification code may be a tracking code provided by the user computer. The user computer may be a cellular telephone, personal data assistant, laptop computer, or a desktop computer.

Selection of which of the different version of the webpage can be performed either at the user computer (e.g., by a web browser executing a script provided by the server) or at the server computer. Selection can be based on one or more bits of the identification code (e.g., the least significant bit).

In another aspect, the invention features a method for implementing an A/B test of a webpage that includes receiving at a server a plurality of requests over time for a webpage and diverting each of the received requests to one of several different versions of the webpage, each located at a different Uniform Resource Locator, based on one or more bits in an identification code associated with the request.

Implementations may include one or more of the following features. The method may also include tracking responses of users who receive different version of the webpage and then comparing the tracked responses of users.

Diversion of the received requests may occur by sending the user computer a webpage containing a script configured to cause the user computer to request one of the several different versions of the webpage based on one or more bits in an identification code (e.g., an IP address of the user computer or a proxy computer) associated with the user computer. Diversion may also occur at the server side by, for example, sending the user computer one of several different versions of the webpage based on an identifier (e.g., a tracking ID cookie) provided with the request.

In another aspect, the invention features a medium bearing instructions to cause an instruction processor to, in response to receiving a request for a webpage from a requesting computer, select one of a plurality of different versions of a webpage based on bits of an identification code (e.g., an IP address, tracker ID code) associated with a user computer making the request, and transmit the selected webpage to the requesting computer.

In another aspect, the invention features a medium bearing instructions to cause an instruction processor to, in response to receiving a request for a webpage from a requesting computer, transmit a webpage containing a script configured to cause the requesting computer to request one of a plurality of different version of the webpage based on one or more bits of an identification code associated with the requesting computer.

Other features, objects, and advantages of the invention will be apparent from the description and drawings, and from the claims.

DESCRIPTION OF THE DRAWINGS

FIGS. 2A-2B are screen shots of two versions of a webpage that is subject to an A/B test.

DETAILED DESCRIPTION

Figure 1:
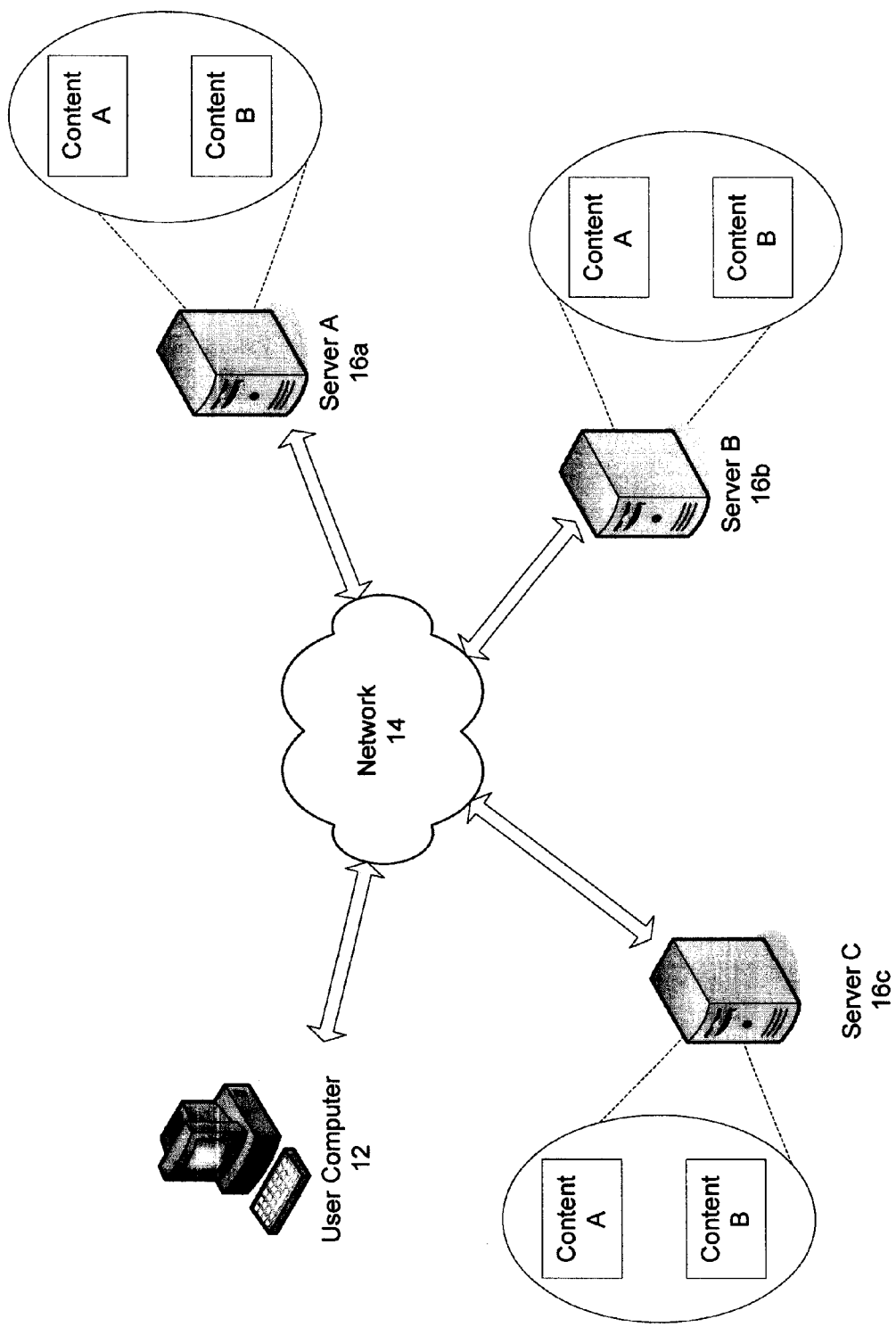
FIG. 1 is a diagram of a computer network.

Referring to FIG. 1, three servers 16a-16c are associated with a company, such as Fidelity Investments®, and provide content to user computers (e.g., user computer 12) that access the company's website via the Internet 12. While user computer 12 is illustrated as a desktop computer, it could be any web-enabled device, such as a laptop computer, cellular telephone, personal data assistant (PDA), etc.

The three servers have identical content and are geographically separated to provide for redundancy and a high level of reliability. Thus, if a power outage or other failure happens at one server site, the other servers can provide content for the company's website to user computers. Requests for content from user computers are diverted by a domain name server (not shown) maintained by the company to one of the three servers based on load and availability of the servers. Thus, for example, if a user types the company's website address in a web browser running on the user computer, a domain name server maintained by the company may divert the user's request to the server that has the least amount of traffic. This server then supplies the content for the requested page.

Occasionally, the company may want to perform A/B testing on various content of its web pages to determine factors of a web page that affect usability of the webpage. For example, as shown in FIGS. 2A-2B, the company may want to sent two different versions of a "Mutual Funds" webpage to different groups of users to see which version, if either, evokes a better response from users. The web page shown in FIG. 2A is identical to the version shown in FIG. 2B except for the box labeled "Spotlight". In the version depicted in FIG. 2A, only a portion of the text of each bullet in the Spotlight box is hyperlinked to another webpage, whereas in the version depicted in FIG. 2B, the entire text of each bullet is hyperlinked. The company may send the page having the first Spotlight box (content "A") to some users who access the mutual funds webpage and the page having the box (content "B") to other users, and then track user response to see if one version prompts a higher percentage of users to click on one of the hyperlinks in the Spotlight box than the other version. If the percentage difference is statistically significant, then the company may adopt the version with the higher click rate.

To maintain a redundancy and a high level of reliability, it is advantageous to ensure that all of the servers used by the company to provide content for its website contain identical content. Thus, rather than having one server maintain content "A" for a first version of a webpage and a second server maintain content "B" for a second version of a webpage, the system depicted in FIG. 1 provides the content for both versions on the same server. Accordingly, when a request for content of a webpage that is the subject of an A/B test is received by a server, the company must use some mechanism to determine whether to supply the request using a first or second (or other) version of the webpage.

One way to select among different versions of a webpage is to use one or more bits in the user computer's Internet Protocol (IP) address. Thus, for example, if a user computer has an even-numbered IP address (i.e., its least significant bit is a zero), then a content "A" may be supplied in response to the webpage request, whereas if the user computer has an odd-numbered IP address (i.e., its least significant bit is a one), then content "B" may be supplied. In many instances a proxy server submits a request for a webpage on behalf of a user computer, and in these instances, the IP address of the proxy server can be used to select content for a requested webpage.

Figure 3:
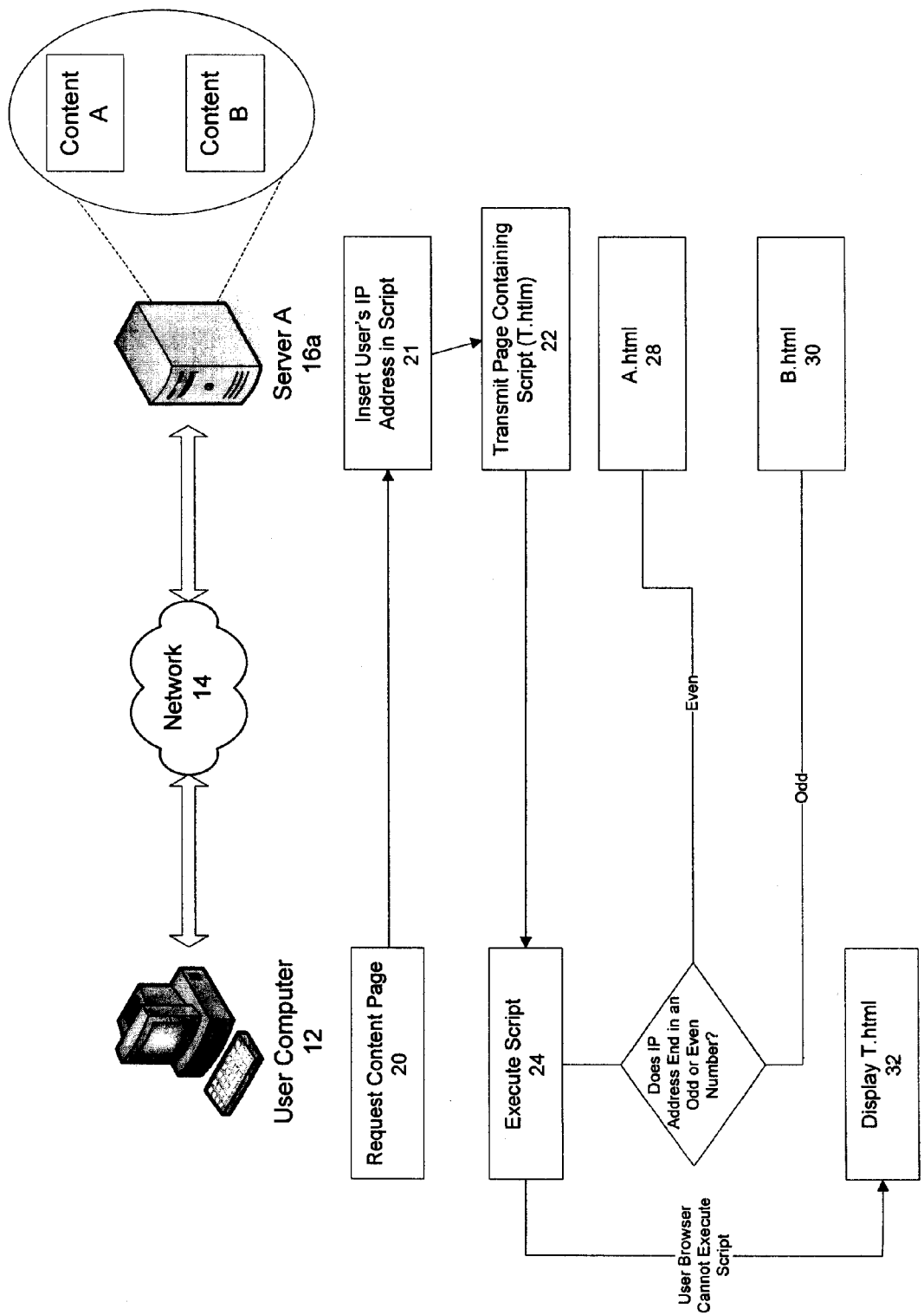
FIGS. 3-4 are diagrams of a user computer and a server communicating over a network.

Referring to FIG. 3, a system for providing different content for a webpage undergoing an A/B test based on the IP address of the user computer is illustrated. A user computer 12 requests (20) a webpage from one of the company's servers, e.g., server 16a. When the server receives the user's request, it assembles a target page, T.html, located at a particular Uniform Resource Locator (URL) that has the following snippet of JavaScript in its page content:

```
<script type = "text/javascript">
var ipaddress = '<!--#echo var="REMOTE_ADDR"-->';
location.replace((new Array("A.html","B.html"))
    [ipaddress.charAt(ipaddress.length – 1) % 2]);
</script>
```

The server also inserts (21) the IP address of the requesting user (or proxy server) into the #echo directive (i.e., '<! - - #echo var="REMOTE_ADDR"- - >') and then sends (22) the page to the user computer.

When a browser on the user computer receives the target page it executes (24) the JavaScript, which conditionally redirects the user's browser to either A.html (28) (which has a unique URL) or B.html (30) (which also has a unique URL) depending upon whether the user's IP address is even or odd. One way in JavaScript to determine whether the user's IP address is even or odd is to use the charAt command shown above. The server can then track user responses to the two web pages (i.e., A.html and B.html) to determine whether users who received A.html responded differently than user's who received B.html. While two different versions of a webpage are usually made highly similar to test user reaction to small changes to a given page, they can be identified by any arbitrary pair of URLs.

If the user does not have a browser capable of executing the JavaScript, the browser displays (32) the content of the target page, T.html. In some implementations, the target page includes a noscript tag, which is a HTML/XHTML element used to define an alternate content if a script is not executed. The noscript tag can be used to display content "A", content "B", or some other content (e.g., a message indicating that the user's browser does not support JavaScript) if the browser does not execute the script.

Some implementations may use other bits in the user's IP address to divide traffic into arbitrarily small segments. For example, an A/B tester may want to divert 10% of the traffic to A.html, 20% to B.html, and 70% to C.html. Assuming that bits in received IP addresses are approximately uniformly distributed among all possibilities, the system can divert user IP addresses ending in a particular number, say the number three (011), to A.html, divert user IP addresses ending in two other numbers, say five (101) and six (110), to B.html, and all others to C.html.

Figure 4:
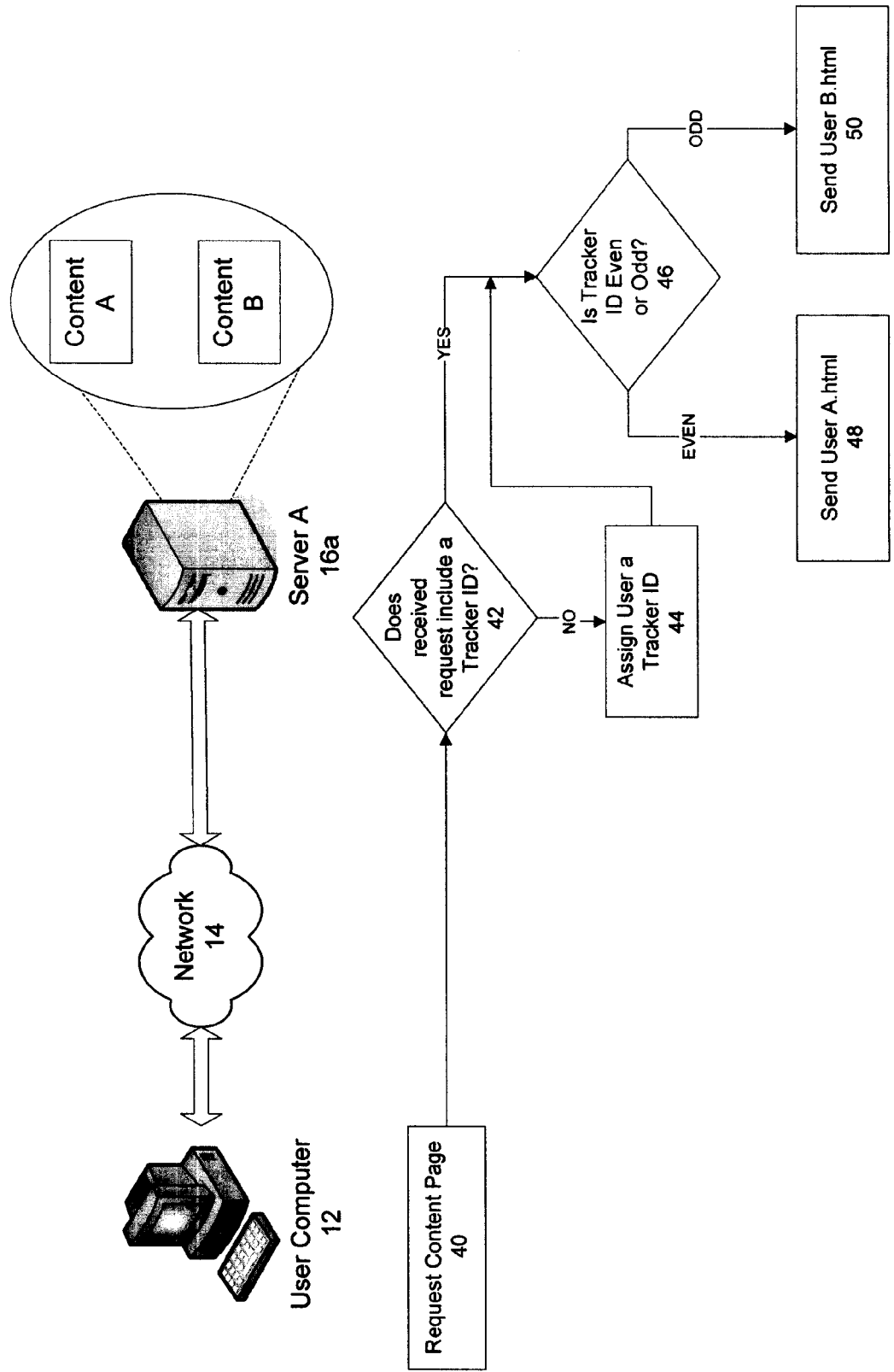

Some implementations may use server-side logic to divert traffic. For example, as shown in FIG. 4, user computer 12 transmits (40) a request for a web page to server 16a. When the server 16a receives the request, it checks (42) to see if a tracker identification accompanies the request. A tracker identification is type of cookie that is deposited on the user's computer, for example, when a user visits the company's website. When the user subsequently requests information from the company website, the browser will include the tracker identification with the URL request.

If the request includes a tracker identifier, the server examines (46) the least significant bit of the tracker identifier to determine if it is even or odd. If the tracker identifier is even, the server sends A.html (48) (located at a unique URL) to the user. If odd, the server sends B.html (50) (located at a different URL). If the user request does not include a tracker identifier, the server assigns (44) the request a tracker identifier and then sends either A.html (48) or B.html (50) depending upon whether the assigned tracker identifier is even or odd.

As with the user-side approach, a server-side approach can use any of the bits in the user identifier to choose which version of a webpage to provide to a user. For example, if an A/B tester wants to divert 25% of the traffic to A.html and 75% to B.html, the server can be configured to look at any two bits of a received user identifier (e.g., the last two bits or the first and the last bit). If the two examined bits are one value, say zero (00), the server can direct the request to A.html. If the two examined bits are any other value (e.g., 01, 10, or 11) the server directs the request to B.html. Assuming that the values of the two examined bits are distributed uniformly among all possibilities, then approximately 25% of the traffic will see A.html and 75% of the traffic will see B.html. Responses of some or all of the users who receive A.html and B.html can be tracked to see if one version elicits a more positive response than the other version. By repeating this process on small changes to the company's website, the company can continuously improve usability of the site.

Other embodiments are within the scope of the following claims. For example, while the user-side approach illustrated in FIG. 3 uses an IP address associated with the user computer to provide different versions of a webpage, some implementations may use other identification codes associated with the user computer (e.g., a tracker ID code) to provide different versions of a webpage. Similarly, in the server-side approach, any user identification code (e.g., user or proxy IP address, tracker ID, etc.) can be used to provide different versions of a webpage in response to a request.

What is claimed is:

1. A method comprising:
    sending, by a client computer system to one or more server computer systems, a request for an electronic communication which is subject to a test to identify factors that affect usability of the electronic communication;
    receiving, by the client computer system from the one or more server computer systems, a version of the electronic communication;
    wherein the received version of the electronic communication comprises at least one of a first version of an electronic communication that satisfies the request with the first version promoting identification of first factors that affect the usability, or a second, different version of the electronic communication that satisfies the request, with the second version promoting identification of second, different factors that affect the usability; and
    sending, by the client computer system to the one or more server computer systems, one or more responses to the received electronic communication to promote identification by the one or more server computer systems of one or more factors that increase the usability of the requested electronic communication relative to the usability of the requested electronic communication based on other factors.

2. The method of claim 1, wherein the electronic communication is a web page.

3. The method of claim 1, wherein the version of the electronic communication that is received is selected by the one or more server computer systems from at least the first version of the electronic communication that satisfies the request with the first version promoting identification of first factors that affect the usability, and the second, different version of the electronic communication that satisfies the request, with the second version promoting identification of second, different factors that affect the usability and with selecting being at least partly based on one or more bits of information included in the request.

4. The method of claim 3 wherein the two different versions of the electronic communication are different with respect to a visible interactive element.

5. The method of claim 3, wherein the request includes an identification code with one or more bits of information, with the selected version of the electronic communication is at least partly based on whether one or more values for the one or more bits in the identification code match one or more of a first value associated with the first version of the electronic communication and a second, different value associated with the second version of the electronic communication.

6. The method of claim 5, wherein the one or more bits of information comprise an address of the client computer system.

7. The method of claim 1 wherein receiving the version comprises:
    receiving a webpage comprising a script;
    executing the script; and
    requesting, based on execution of the script, the first version of the electronic communication from a Uniform Resource Location.

8. The method of claim 1 wherein the client computer system comprises one or more of a mobile device, a personal data assistant, and a personal computer.

9. One or more machine-readable hardware storage devices storing instructions that are executable by one or more processing devices of a client computer system to perform operations comprising:
    sending, by the client computer system to one or more server computer systems, a request for an electronic communication which is subject to a test to identify factors that affect usability of the electronic communication;
    receiving, by the client computer system from the one or more server computer systems, a version of the electronic communication;
    wherein the received version of the electronic communication comprises at least one of a first version of an electronic communication that satisfies the request with the first version promoting identification of first factors that affect the usability, or a second, different version of the electronic communication that satisfies the request, with the second version promoting identification of second, different factors that affect the usability; and
    sending, by the client computer system to the one or more server computer systems, one or more responses to the received electronic communication to promote identification by the one or more server computer systems of one or more factors that increase the usability of the requested electronic communication relative to the usability of the requested electronic communication based on other factors.

10. The one or more machine-readable hardware storage devices of claim 9, wherein the electronic communication is a web page.

11. The one or more machine-readable hardware storage devices of claim 9, wherein the version of the electronic communication that is received is selected by the one or more server computer systems from at least the first version of an electronic communication that satisfies the request with the first version promoting identification of first factors that affect the usability, and the second, different version of the electronic communication that satisfies the request, with the second version promoting identification of second, different factors that affect the usability and with selecting being at least partly based on one or more bits of information included in the request.

12. The one or more machine-readable hardware storage devices of claim 11, wherein the two different versions of the electronic communication are different with respect to a visible interactive element.

13. The one or more machine-readable hardware storage devices of claim 11, wherein the request includes an identification code with one or more bits of information, with the selected version of the electronic communication is at least partly based on whether one or more values for the one or more bits in the identification code match one or more of a first value associated with the first version of the electronic communication and a second, different value associated with the second version of the electronic communication.

14. The one or more machine-readable hardware storage devices of claim 13, wherein the one or more bits of information comprise an address of at least one of the client computer system.

15. An electronic system comprising:
    a client computer; and one or more machine-readable hardware storage devices storing instructions that are executable by the client computer to perform operations comprising:

sending, by the client computer to one or more server computer systems, a request for an electronic communication which is subject to a test to identify factors that affect usability of the electronic communication;

receiving, by the client computer from the one or more server computer systems, a version of the electronic communication;

wherein the received version of the electronic communication comprises at least one of a first version of an electronic communication that satisfies the request with the first version promoting identification of first factors that affect the usability, or a second, different version of the electronic communication that satisfies the request, with the second version promoting identification of second, different factors that affect the usability; and sending, by the client computer to the one or more server computer systems, one or more responses to the received electronic communication to promote identification by the one or more server computer systems of one or more factors that increase the usability of the requested electronic communication relative to the usability of the requested electronic communication based on other factors.

16. The electronic system of claim 15, wherein the electronic communication is a web page.

17. The electronic system of claim 15, wherein the version of the electronic communication that is received is selected by the one or more server computer systems from at least the first version of an electronic communication that satisfies the request with the first version promoting identification of first factors that affect the usability, and the second, different version of the electronic communication that satisfies the request, with the second version promoting identification of second, different factors that affect the usability and with selecting being at least partly based on one or more bits of information included in the request.

18. The electronic system of claim 17, wherein the two different versions of the electronic communication are different with respect to a visible interactive element.

19. The electronic system of claim 17, wherein the request includes an identification code with one or more bits of information, with the selected version of the electronic communication is at least partly based on whether one or more values for the one or more bits in the identification code match one or more of a first value associated with the first version of the electronic communication and a second, different value associated with the second version of the electronic communication.

20. The electronic system of claim 19, wherein the one or more bits of information comprise an address of the client computer.

* * * * *